H. G. TYER & J. HELM.
ELASTIC FABRIC.
No. 14,814.  Patented May 6, 1856.
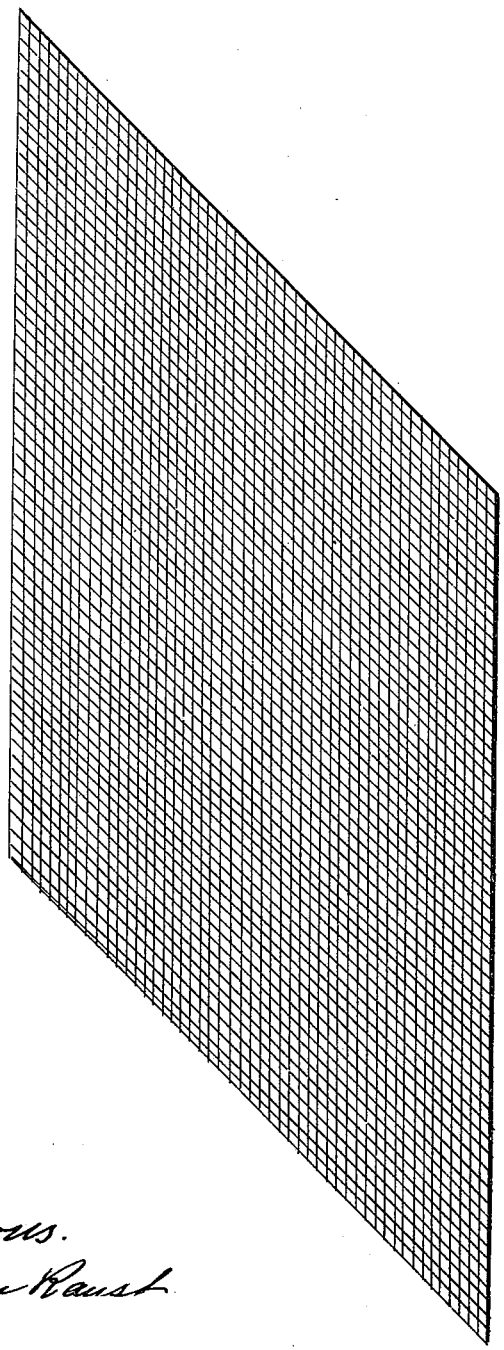
Witnesses
Inventor

UNITED STATES PATENT OFFICE.

HENRY G. TYER, OF BALLARD VALE, MASSACHUSETTS, AND JOHN HELM, OF NEW BRUNSWICK, NEW JERSEY.

MAKING GUM-ELASTIC CLOTH.

Specification of Letters Patent No. 14,814, dated May 6, 1856.

*To all whom it may concern:*

Be it known that we, HENRY G. TYER, of Ballard Vale, county of Essex, and State of Massachusetts, and JOHN HELM, of New Brunswick, county of Middlesex, State of New Jersey, have invented a new and useful Elastic Fabric Suitable for All the Great Variety of Purposes wherein Considerable Elasticity is Required.

Our invention consists of an elastic fabric composed exclusively of two pieces of woven cloth having the threads of the weft in a diagonal position to the threads of the warp like the fabric for which Letters Patent were granted by the United States to John Healey of England under date of the 18th day of December, 1855, combined and united together in the manufacture thereof by a vulcanizable compound of india rubber or gutta percha to be thereafter vulcanized.

We are aware that pieces of common cloth have been cemented together with rubber cement to make waterproof goods; for such has long been practiced by us in the manufacture of what is known as the McIntosh goods; but those goods have no analogy to the fabric for which we ask a patent, as they were neither elastic goods or intended to be; nor were they composed of diagonal cloth or of any cloth united by a vulvanized compound. We are also aware that elastic goods have been made by having the sides of two pieces of cloth cemented by a rubber cement and then having the two cemented sides, with threads or strips of rubber between them placed together, and caused to adhere. Such is described in the English patent granted to Caleb Bedel in 1844, also in the shirred goods patent (with the rubber threads stitched) granted to Charles Goodyear; and also in the patent for a process of making elastic goods granted to Richard Solis. But none of these goods are like the goods for which we ask a patent, either in construction, component parts, manner or process of making, or qualities or utility. In none of those goods was there cloth with the threads of the weft standing in a diagonal position to the threads of the warp, except in the goods made by the Solis process, and those goods differ from ours in essential and important parts and properties.

In the goods made by the Solis process, unvulcanized and unvulcanizable material is between the pieces of woven cloth, and the substance by which the pieces of woven cloth are caused to adhere is neither vulcanized or vulcanizable; and the same is true in respect to the shirred goods for which the patent was granted to Goodyear, and the consequence is that those goods, both of Solis and of Goodyear, are liable to become comparatively useless after being used in consequence of perspiration and animal heat softening and decomposing the substance or cement by which the two pieces of cloth were united, and allowing it to give way, and the pieces of cloth to separate. This difficulty has always been a great objection to any known elastic goods, and this is one of the evils which our invention is designed to overcome.

It has long been regarded by those engaged in the manufacture and sale of elastic goods as a matter of great consequence to produce an article of elastic goods the parts of which should firmly adhere together under all the changes of weather, climate and circumstances attending their use. To accomplish that object and supply the public with such an article, after investigation, we became satisfied that it would be necessary to devise and form elastic goods, every element of which would so far stand the changes of temperature and degrees of dampness as to withstand and be proof against perspiration and animal heat; so that neither would cause the parts of the goods to separate or otherwise impair them, and at the same time secure great elasticity. Such an article we have produced; and it is for this article, as a new manufacture, differing essentially from anything before known, and of great value, that we claim a patent. And to enable others to make and use our said invention, we will proceed to describe its formation in detail.

The drawing hereto annexed represents a piece of the fabric with the threads of the cloth at a considerable distance apart, so as to better show the positions of the threads. The red lines represent the threads of the warp, and the green lines the threads of the filling of the woven cloth, and the ground color represents the vulcanized compound seen through the meshes of the threads.

We first prepare in a plastic state the india rubber, or the gutta percha, vulcanizable compounds (but we prefer the india rubber compound) and then prepare a quantity of cloth, having the threads of the weft in a diagonal position to those of the warp such as is shown by the drawing, and such as was patented by the Letters Patent granted to John Healey by the United States as aforesaid, and which, and the manner of preparing the same, is particularly described in the specification of the said Healey patent; and then, and while the vulcanizable compound is still in a plastic state, we apply it to one side of each of two pieces of the cloth, and cause it to adhere thereto, and the two pieces of cloth to thereby adhere together, by means of rollers, or any other known machinery; but for this purpose, in general, we prefer to use the process for applying the compound for which a patent was granted to us by the United States, dated the 30th day of January 1855. After these parts are thus united the article formed is comparatively nonelastic, and will remain so until that part of it which is between the two pieces of woven cloth has been vulcanized. We therefore next vulcanize that part, by subjecting the whole to a high degree of heat by any known means or in any known manner, whereupon the whole becomes very elastic, susceptible of great extension and contraction and capable of standing animal heat and dampness or perspiration.

Our new manufacture is not only far superior in elasticity and durability to any other known elastic goods; but it can be manufactured at much less cost.

We do not claim as our invention the weaving of cloth, or cloth woven with the threads of the weft diagonally to the threads of the warp; for that was patented by said Healey; nor do we claim the stretching of cloth so that the threads of the weft while held in the stretched condition shall stand diagonally to the threads of the warp. Nor do we claim generally the cementing of threads or sheets of rubber between two pieces of cloth so stretched; nor do we claim any elastic fabric consisting of two pieces of stretched cloth, united in whole or in part by unvulcanizable materials; but What we do claim as our new manufacture, is—

An elastic fabric composed of two pieces of cloth, either woven with the threads of the weft in a diagonal position to the threads of the warp, or of common cloth stretched so as to force the threads in such relative diagonal position, combined and caused to adhere together exclusively by a vulcanized compound of india rubber or gutta percha, the two pieces of cloth being first united by the vulcanizable compound and the compound being vulcanized after the union, substantially as set forth.

HENRY G. TYER.
     JOHN HELM.

Witnesses to Henry G. Tyer:
 CHARLES WINSLOW,
 SAML. GRAY.

Witnesses as to John Helm:
 M. B. ANDREWS,
 JAMES A. VAN RANET.